United States Patent
Jabbour et al.

(10) Patent No.: US 11,170,664 B2
(45) Date of Patent: Nov. 9, 2021

(54) KIT, METHOD AND APPARATUS FOR SURGICAL SIMULATION AND/OR FINE MOTOR SKILL TRAINING FOR SURGICAL WORK

(71) Applicants: Noel Jabbour, Pittsburgh, PA (US); Micah Milad Jabbour, Pittsburgh, PA (US); Nathan Nabil Jabbour, Pittsburgh, PA (US)

(72) Inventors: Noel Jabbour, Pittsburgh, PA (US); Micah Milad Jabbour, Pittsburgh, PA (US); Nathan Nabil Jabbour, Pittsburgh, PA (US)

( * ) Notice: Subject to any disclaimer, the term of this patent is extended or adjusted under 35 U.S.C. 154(b) by 431 days.

(21) Appl. No.: 16/131,406

(22) Filed: Sep. 14, 2018

(65) Prior Publication Data
US 2019/0088163 A1    Mar. 21, 2019

Related U.S. Application Data

(60) Provisional application No. 62/559,048, filed on Sep. 15, 2017.

(51) Int. Cl.
*G09B 23/28* (2006.01)
*G09B 19/24* (2006.01)
(Continued)

(52) U.S. Cl.
CPC .............. *G09B 23/28* (2013.01); *G09B 9/00* (2013.01); *G09B 19/003* (2013.01); *G09B 19/24* (2013.01)

(58) Field of Classification Search
None
See application file for complete search history.

(56) References Cited

U.S. PATENT DOCUMENTS 6,149,642 A * 11/2000 Gerhart ............ A61B 17/00234
                                                        128/897
7,837,473 B2 * 11/2010 Koh ..................... G09B 23/285
                                                        434/262
(Continued)

FOREIGN PATENT DOCUMENTS

WO    WO-2016191661 A1 * 12/2016    ............. G09B 23/34
WO    WO-2017173520 A1 * 10/2017    ............. G09B 23/28

OTHER PUBLICATIONS

Chen, Xianyu et al., "A Novel Portable Foldable Laparoscopic Trainer for Surgical Education," Journal of Surgical Education, 2015 (Year: 2015).*

*Primary Examiner* — Malina D. Blaise
*Assistant Examiner* — Elizabeth Verniers Johnson
(74) *Attorney, Agent, or Firm* — Buchanan Ingersoll & Rooney PC

(57) ABSTRACT

A method, apparatus and kit can be configured to facilitate improvements in fine motor skills of a user. The fine motor skills can be practiced in a way that also allows the user to better appreciate depth perception and other issues associated with manipulation of objects by use of hand operated tools while the user views an image of such activity via imaging provided by a camera sensor connected to a display device. In some embodiments, a case can be provided that is moveable from a closed position to an open and standing position to facilitate activities that allow a user to improve his or her fine motor skills and other related skills (e.g. depth perception appreciation). Such skill improvement can help a user improve their ability to perform surgical operational tasks or other fine motor related tasks.

20 Claims, 8 Drawing Sheets

(51) Int. Cl.
*G09B 9/00* (2006.01)
*G09B 19/00* (2006.01)

(56) References Cited

U.S. PATENT DOCUMENTS

| | | | |
|---|---|---|---|
| 8,960,421 B1* | 2/2015 | Diebel | G06F 1/1628 |
| | | | 206/45.2 |
| 9,070,306 B2 | 6/2015 | Rappel et al. | |
| 9,092,996 B2 | 7/2015 | Meglan et al. | |
| 9,472,121 B2 | 10/2016 | Pravong et al. | |
| 9,489,869 B2 | 11/2016 | Riojas et al. | |
| 9,601,030 B2 | 3/2017 | Ratcliffe et al. | |
| 9,734,732 B2* | 8/2017 | Jabbour | G09B 23/285 |
| 2008/0064017 A1* | 3/2008 | Grundmeyer | G09B 23/28 |
| | | | 434/262 |
| 2015/0199920 A1 | 7/2015 | Rowbottom et al. | |
| 2016/0140876 A1* | 5/2016 | Jabbour | G09B 23/285 |
| | | | 434/262 |
| 2017/0004738 A1* | 1/2017 | Pravong | G09B 5/02 |
| 2017/0119471 A1 | 5/2017 | Winner et al. | |
| 2018/0108276 A1* | 4/2018 | Ishiyama | G09B 23/32 |
| 2018/0225991 A1* | 8/2018 | Pedroso | G09B 23/285 |

\* cited by examiner

KIT, METHOD AND APPARATUS FOR SURGICAL SIMULATION AND/OR FINE MOTOR SKILL TRAINING FOR SURGICAL WORK

CROSS-REFERENCE TO RELATED APPLICATION

The present application claims priority to U.S. Provisional Patent Application No. 62/559,048, filed on Sep. 15, 2017. The entirety of U.S. Provisional Patent Application No. 62/559,048 is incorporated by reference herein.

FIELD OF THE INVENTION

The present innovation relates to a kit, apparatus, and method for developing fine motor skills that are applicable to surgeries.

BACKGROUND OF THE INVENTION

Examples of surgical training devices are described in U.S. Pat. Nos. 9,601,030, 9,489,869, 9,472,121, 9,092,996, 9,070,306, and U.S. Pat. App. Pub. Nos. 2017/0119471, 2016/0140876 and 2015/0199920. Such devices and systems often fail to provide a user with practical experience in physically touching and manipulating different tools in a way that can mimic what is actually experienced during a surgical procedure. Further, such systems and devices can be difficult to transport and expensive to reproduce, thereby limiting the accessibility to surgical skills training.

SUMMARY OF THE INVENTION

We determined that a new method, kit, and apparatus for developing fine motor skills applicable to surgical operations is needed. The development of fine motor skills by embodiments of my apparatus, method, and kit can include helping a person develop an appreciation for depth perception issues associated with surgical procedures and how to finely move their fingers and/or hands to utilize tools for affecting parts of a body or use of tools or devices in a body cavity during a surgery. Embodiments can be configured to facilitate a user's practicing of different tasks that require use of fine motor skills to help the user improve those fine motor skills so the user can try and further develop fine motor skills. It is contemplated that such practice that can be facilitated by embodiments may help the user improve skills associated with surgical operations and use of tools in such operations.

For instance, a method for practicing fine motor skills of a user to improve those skills is provided. Embodiments of this method can include: moving a lid of a case to open the case; removing a board from a window of a body retained in a support portion of the case that is moveably connected to the lid; moving the lid and the support portion so that the case is moved to a standing position; placing the board on a work surface under the lid and the support portion while the case is in the standing position so that the board is visible via an opening defined by the window of the body; manipulating a first tool to move the first tool above the board while the board is on the work surface and the case is in the standing position via a first side opening defined by the lid and the support portion of the case; and using the first tool to move at least one object on the board while the board is on the work surface and the case is in the standing position.

In some embodiments, the object can be an elongated member that is positionable through annular structures positioned on the board. As an alternative, the object can include at least one member that is movably positionable in different holes defined in the board. In yet other embodiments, there may be multiple objects that include multiple members and at least one elongated member.

The first tool can be a tweezer or can be a tapered tool (e.g. a tapered rod, a chopstick, etc.). The method can also include use of additional tools. For instance, the method can also include manipulating a second tool to move the second tool above the board while the board is on the work surface and the case is in the standing position via a second side opening defined by the lid and the support portion of the case and using the second tool in conjunction with movement of the first tool to move at least one object on the board while the board is on the work surface and the case is in the standing position. In some embodiments, the first and second tools can each be a tapered tool, such as a tapered rod or bar. In other embodiments, the first and second tools can be different tools, such as a pair of forceps and a rod.

In some embodiments of the method, the at least one object can include an elongated member that is passable through annular structures defined on the board or a member that is removably positionable within different holes defined in the board. The at least one object can also include a plurality of members that are moveably positioned on the board via different holes defined in the board.

The method can also include use of an insert that may be retained within the case when the case is in a closed position. For instance, the method can include extending an insert positioned on an inner surface of the lid after the case is opened so that the insert is moved from a stored position to an extended support position. For instance, the extending of the insert can include adjusting the insert so that a distal portion of the insert is moved away from a first portion of the insert that is positioned on the inner surface of the lid. As another example, the adjusting of the insert can occur so that a distal portion of the insert is moved away from a first portion of the insert that is positioned on the inner surface of the lid via motion of a second portion of the insert about a first fold defined between the first portion of the insert and the second portion of the insert and via motion of a third portion of the insert about a second fold defined between the second portion of the insert and a third portion of the insert. The distal portion of the insert can be positioned to engage a lower end of the support portion of the case to maintain the case in the standing position such that the third portion of the insert is between the lower end of the support portion of the case and a lower end of the lid when the case is in the standing position and the second portion of the insert is between the lower end of the lid and the lower end of the support portion of the case when the case is in the standing position and the third portion of the insert and the second portion of the insert define the work surface under the lid and under the support portion of the case.

The method can also include other steps. For instance, the method can include contacting the second portion of the insert and the third portion of the insert with a desktop, a tabletop, or a countertop when the case is in the standing position and prior to placing the board on the work surface. As another example, the method can include mounting an electronic device on the body while the case is in the standing position to position a camera sensor of the electronic device over the opening and generating an image of the board on a display of the electronic device after the electronic device is mounted on the body while the case is in the standing position. As yet another example, the method can also include recording motion of the first tool over the board via the camera sensor and displaying the motion of the first tool over the board via the display while the electronic device is mounted on the body while the case is in the standing position.

A kit for developing fine motor skills applicable to surgical operations is also provided. The kit can include a case having a lid that is moveably connected to a support portion such that the case is moveable between a closed position to an open position; a body retained by the support portion of the case; a board removably positionable in the opening of the body where the board has a plurality of annular structures and holes, a first elongated member that is passable through the annular structures where the first elongated member is retainable within the case when the case is in the closed position; a plurality of members that are removably positionable within the holes of the board where the plurality of members are retainable within the case when the case is in the closed position. The board can be sized and configured to be positionable on a work surface under the lid and under the support portion of the case when the case is moved to a standing position via motion of the lid relative to the support portion such that the board is viewable through the opening of the body when the board is on the work surface under the lid and under the support portion of the case. The kit can also include other elements. For example, the kit can include an insert that is moveable between a stowed position in which it is retainable within the case when the case is in the closed position and a support position in which the insert is extended from the lid to help maintain the case in the standing position of the case. As another example, the kit can include multiple tools and/or objects that may be moveable along the board.

Other details, objects, and advantages of the apparatus and kit for surgical training will become apparent as the following description of certain exemplary embodiments thereof proceeds.

BRIEF DESCRIPTION OF THE DRAWINGS

Exemplary embodiments of an apparatus and kit for developing fine motor skills applicable to surgical operations methods of making and using the same are shown in the drawings included herewith. It should be understood that like reference numbers used in the drawings may identify like components.

As shown in FIG. 2, a removable game board element is removed from a body 2 attached within the support portion 2a of the case 1 and is positioned below and in alignment with an opening 4 in the body 2 that is covered by a mobile electronic device 22 having a camera sensor (e.g. a smart phone, a tablet, etc.). The lid 3 and support portion 2a extend away from each other at an angle to engage a work surface when in the standing position. The mobile electronic device is mounted to a portion of the body 2 so that a camera sensor of the electronic device can facilitate a display of the removable game board element via a display device (e.g. display 23) of the mobile electronic device. The electronic device can mounted such that it is able to rest on the body via a mounting feature of the body 2 so that the electronic device is easily positionable on and removable from the body 2 adjacent the window 5 that defines the opening 4 of the body 2. A user's hands are illustrated in FIG. 2 as using tools 7 positionable within the case when the case 1 is in a closed state to illustrate an example of how the apparatus can be used to improve fine motor skills of the user.

As shown in FIG. 4, the removable game board element is removed from the body 2 retained in the support portion 2a of the case 1 and is positioned below and in alignment with an opening 4 in the body 2 that is covered by a mobile electronic device having a camera sensor (e.g. a smart phone, a tablet, etc.). The mobile electronic device is removably mounted to a portion of the body 2 so that a camera sensor can facilitate a display of the removable game board element via a display device of the mobile electronic device as well as recording of the game board element on the work surface and any use of tools over the game board element to manipulate one or more members on the game board element.

as shown in FIG. 1) to an open state (e.g. as shown in FIGS. 2-4) and subsequently moved into a standing position (e.g. as shown in FIGS. 2-4) so that a game board element is positionable below the lid 3 and the support portion 2a of the case 1 when it is in the standing position for subsequent use of the game board element on a work surface 15 by a user.

DETAILED DESCRIPTION OF EXEMPLARY EMBODIMENTS

Figure 1:
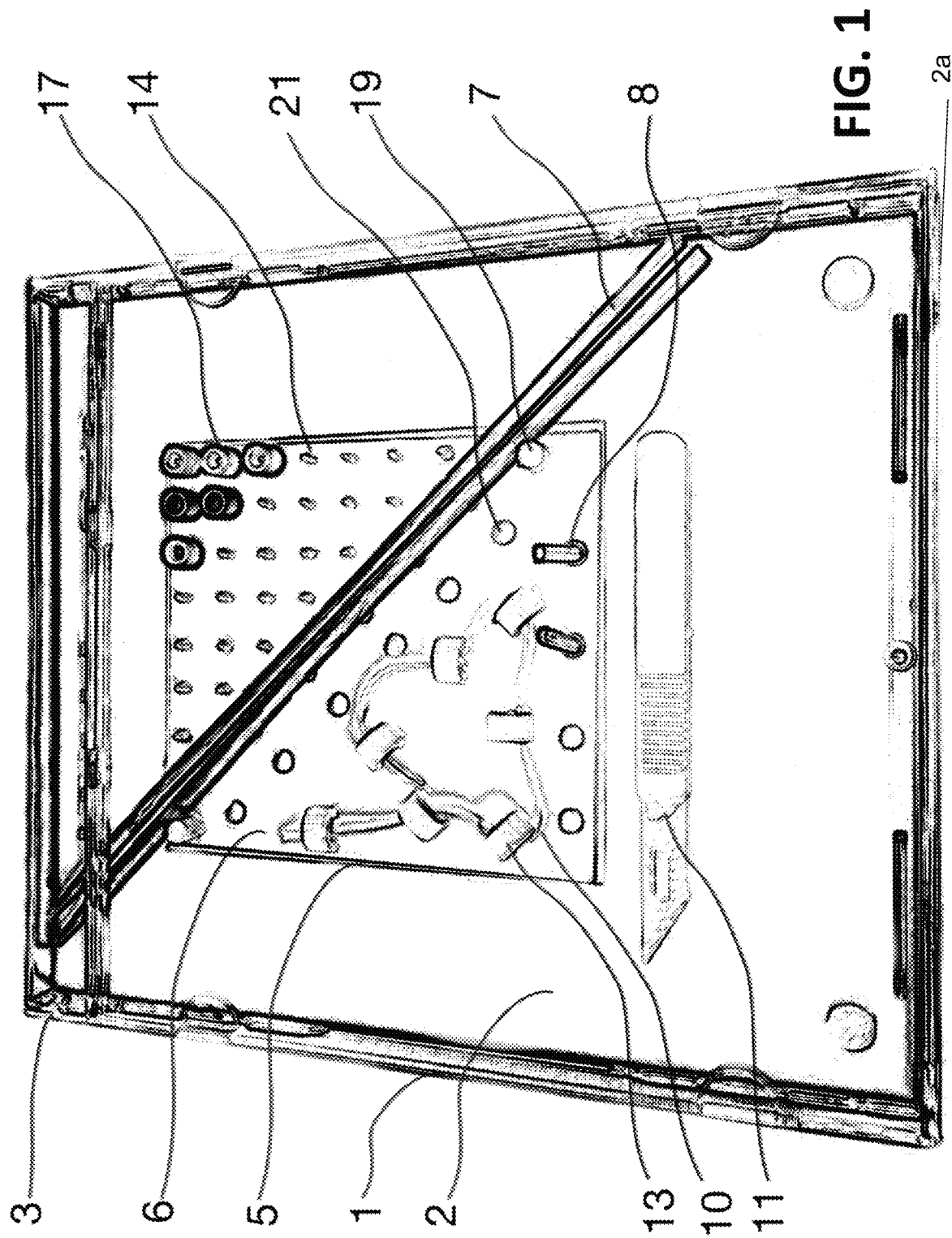
FIG. 1 is a top view of a first exemplary embodiment of an apparatus for developing fine motor skills applicable to surgical operations with a case 1 of the device for retaining parts of a kit in a closed state. The exemplary case 1 includes a clear lid 3 that is moveably attached to a support portion 2a of the case 1. The support portion 2a of the case 1 can be configured to retain a body 2 that can be visible through the clear lid 3 (e.g. the lid 3 can be composed of a transparent material such as a clear polymeric material or a clear glass material). The support portion 2a can also be composed of a transparent material (e.g. be clear). The body 2 can be configured to releaseably retain a board element as well as tools and other elements of the kit that can be utilized by a user to improve the user's fine motor skills. A foldable insert 61 that is providable in the case 1 is cut away in FIG. 1 to help better illustrate elements that can be retained within the case when the case is in the closed position.

An apparatus for developing fine motor skills applicable to surgical operations can be configured as a kit that includes a case 1 that retains a body 2 that has a window 5 sized to releaseably receive a board 6 within an opening 4 of the window 5. When the board 6 is within the opening 4, the window may be closed 5 and the case 1 can be moved into a closed state for transport of the board and other elements of the apparatus 1. When the case 1 is moved into an open state, the board 6 can be moved out of the window to be positioned on a work surface and the window 5 can be in an open state in which the opening 4 is no longer blocked or partially blocked by the board 6. The support portion 2a that retains the body 2 can be clear or transparent so that a user may look through the opening 4 of the window and also see through the support portion 2a.

The case 1 can include a moveable lid 3 that may be moveably attached to another portion of the case 1 via hinges 3a or other moveable connection mechanisms. The lid 3 can be configured to be releaseably attached to a support portion 2a of the case 1 for example and also be moveable relative to that portion of the case 1 so that the lid is able to be opened. The lid 3 can be moveable so that the case 1 is moveable between open and closed states (e.g. can be moved so that the case 1 is repeatedly opened and closed). When in the closed state, the case 1 can define an enclosed chamber in which a body 2 is retained. When in the open state, the chamber can be accessible via the opened lid so that the body 2 can be manipulatable by a user. Any elements within the case or positioned on the body 2 can also be manipulatable when the case is opened.

The portion of the case that retains the body 2 can be a support portion 2a of the case 1 that is moveably coupled to the lid 3 via hinges 3a or other type of connection mechanism so that the case 1 can be moved into a standing position after the case is moved from a closed position to an open position via a user manipulating the lid 3 and/or the support portion 2a to move the lid 3 relative to the support portion 2a. An exemplary standing position is shown in FIGS. 2-5 and 8.

The body 2 can include structure that is to retain different elements, such as at least one manipulative tool 7, at least one elongated flexible member 10, and a mounting structure or a mounting profile integral with the body 2 that is sized to help retain or hold an electronic device so that a camera sensor of the device is positionable within the opening 4 of the window 5 when the board 6 is removed from the opening 4 and placed on a work surface 15 adjacent the body 2 while the case 1 is open and in a standing position.

The board 6 can include a plurality of elements that are configured to help facilitate the utilization of fine motor skills. These elements may be positionable on the board or storeable on the body when the case is in the closed position. These elements can be moveably connected to the board so that the elements are moveable by a user by the user using the user's hands to manipulate one or more tools 7. The tools can be provided in the case 1. In some embodiments, at least some of the tools may be provided in a kit that is offered separate from the case 1 having the body with the board and some other elements (e.g. a type of tool expansion kit for use with the board 6 and other elements provided within the case 1.

In some embodiments, the board 6 can define an arrangement of a plurality of holes 21, a plurality of posts 19, a plurality of annular structures 13 having central holes and a matrix of pins 14 or other projections. At least some of these pins 14 can be moveably positionable within different holes 21 (e.g. moveable from one of the holes to another one of the holes 21, be configured as a moveable peg 8 that is removably positionable in different holes 21, etc.). In some embodiments, the annular structures can be affixed to the board 6 so that they are not moveable (e.g. defined in the body of the board, integral to the board 6, etc.). In other embodiments, the annular structures can also be removably attachable to the board 6 (e.g. via an interlocking mateable profile defined in the annular structures and the board). The drawings provided herein illustrate an exemplary arrangement of such features. The drawings of U.S. Provisional Patent Application No. 62/559,048 also provide such examples (the entirety of this provisional application is incorporated herein by reference). But, it should be appreciated that the annular structures 13, posts 19, pins 14, holes 21, and other structure can have any number of types of shapes or be arranged in any particular way on the board. All of these elements may be defined by a body of the board such that the board 6 is an integral unitary structure composed of a polymeric material that defines the holes 21, and all of the posts 19, annular structure 13, pins 14, and/or other elements. In other embodiments, some of these elements may be separate structures that are attachable to the board 6.

In addition, a plurality of members 17 having one or more holes or channels defined therein can be provided on the board. At least some of the members 17 can be structured as clylindrical shaped beads, tubular shaped beads (e.g. structured as perler beads for example). The members could alternatively have other shapes or configurations (e.g. tubular, polygonal, shapes having one central channel or multiple different channels defined within the body of the member etc.) The members 17 can be structured so that at least one hole or channel of the member is able to allow the member to be positioned on posts 19, pins 13 or other structure defined on the board 6.

In some embodiments, at least some of the members 17 and/or pins 14 can be moveable from one set of the holes 21 to another set of the holes 21. For example, a first member 17 can be manipulated by a user via at least one tool 7 to be moved from a first hole 21 to a second hole 21 of the board 6. As another example, a first pin 14 could be moved via user manipulation from a first hole to a second hole. The user can also directly manipulate pins 14, annular structures 13, elongated member 10, or the members 17 to define a particular arrangement of these parts to adjust a skill level difficulty for the use of movement of at least one member 17, at least one pin 14 and/or at least one elongated member 10 via at least one tool 7.

One or more flexible elongated members 10 can be included within the case 1 of the apparatus. The flexible elongated members 10 can extend from a first free end to a second free end. Examples of flexible elongated members may be cord segments, a length of suture (e.g. a suture or a segment of a suture), a rubber band that is cut to be an elongated member (e.g. no longer a band), or a segment of string or a flexible filament, rod, or bar of a polymeric material, or a flexible filament, rod, or bar of an elastomeric material. The thickness of the flexible elongated member 10 can be configured so that the free ends of the flexible elongated member can be passed through holes within the annular structures 13 on the board and/or be routed between pins 14 and/or members 17 that may be positioned on the board 6. The middle portion of the flexible elongated member 10 can be configured to have a variable thickness so that some parts of the segment are harder to pass through the structures 13 (and/or passed the pins 14 or members 17 on the board 6) than others or may have a thickness that is uniform with the free ends.

Figure 7:
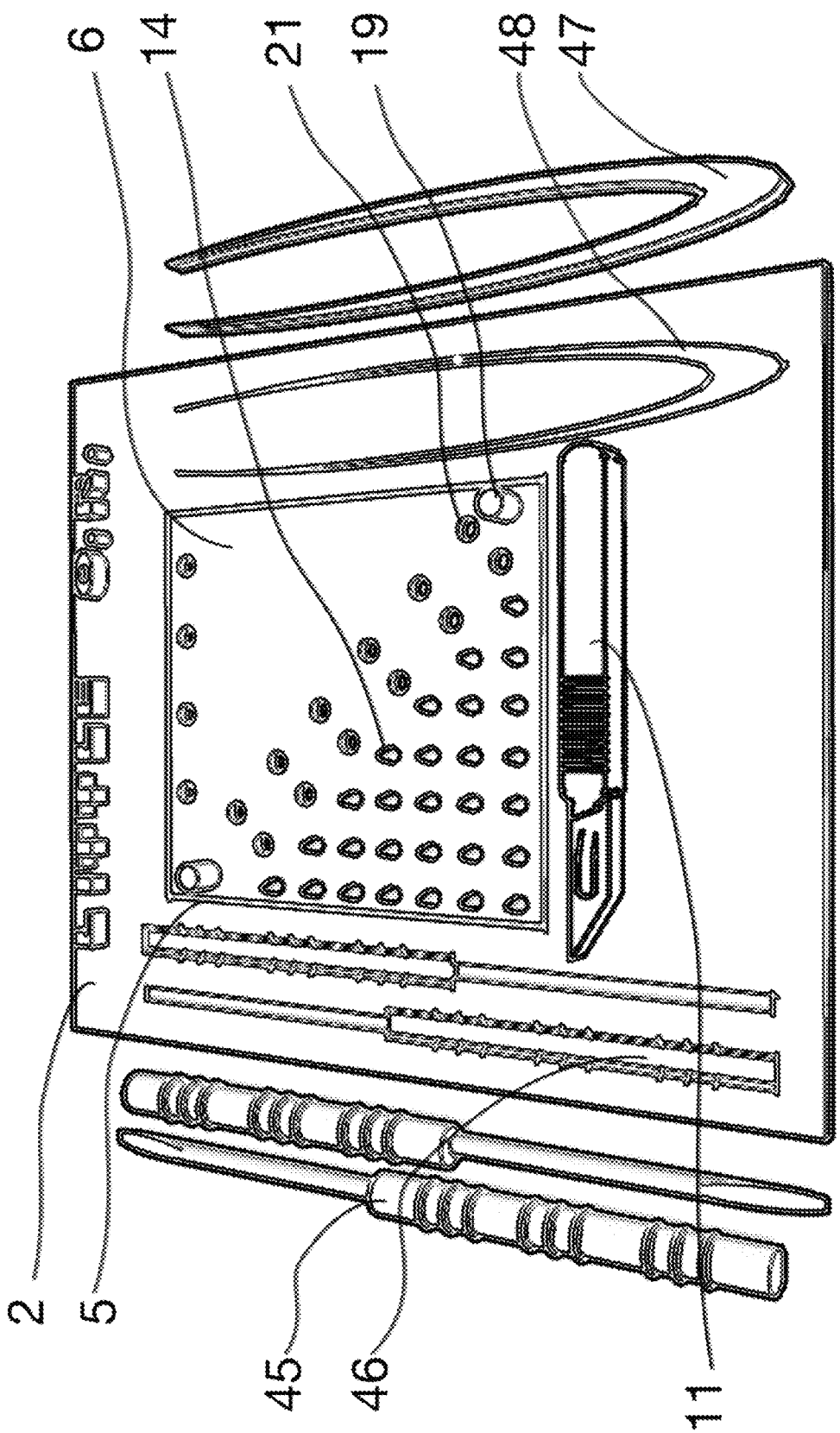
FIG. 7 is an exploded perspective view of the first exemplary embodiment of an apparatus for developing fine motor skills applicable to surgical operations that illustrates an exemplary embodiment of the body 2 that is positionable and/or retainable in the support portion 2a of the case 1. The exemplary embodiment of the body 2 includes recesses 46, 48 defined therein that are configured to releaseably retain tools (e.g. tweezer 47 and tapered instruments 45) and has a central opening defined therein that is configured to releaseably retain the game board element. An exemplary assembly of tools 7 that may be included with the apparatus or sold separately or otherwise used in connection with the apparatus to help develop fine motor skills applicable to surgical operations can be appreciated from the tools shown in FIG. 7.

The apparatus can also include a plurality of tools 7 that may be held by one or more hands of a user for interacting with the board 6 to practice fine motor skills and develop improvements in fine motor skills that may have practical applications in surgical procedures. The tools 7 can include chopsticks or chopstick-like elements, an elongated rod or bar having at least one tapered end, tweezer-like tools, scissor-like tools, knife-like tools (e.g. scalpel tools or polymeric representations of such tools, etc.), forceps or other forcep-like tools. All the tools 7 can be composed of a polymeric material, wood, metal, or other material. For instance, as shown in FIG. 7, an assembly of tools 7 can be includes in the apparatus or a kit for the apparatus that includes tapered rods 45, and tweezers 47 that can be retained within recesses defined in the board on opposite sides of the window 5 that defines the opening 4 in which the board 6 is removably positionable. For instance, there can be a plurality of first recesses 46 defined on top of the board 6 adjacent a first side of the window 5 to retain tapered tools 45 and a second recess 48 defined on the top of the board 6 adjacent a second side of the window 5 to retain a tweezer 47.

Other tools 7 can be provided or included. For instance, other tools 7 can include forceps, clamps, surgical scissors, a polymeric scalpel, different sized tweezers, or other types tools that are defined to look like (or be) surgical tools. In some embodiments, all of the tools 7 can be structured as a unitary polymeric device that is structured to function like a surgical tool the tool resembles so that the tools 7 can provide a low-cost practice tool that can be easily stored in case 1 or by case 1 for development of fine motor skills associated with use of the actual surgical tools the tools 7 represent or resemble. In some embodiments, at least some of the tools can be provided in a separate kit while other tools are provided within the case 1.

In some embodiments, the board 6 and body 2 can be configured to define a particular groove or other type of tool holding space that can be sized to retain one or more tools on the body 2 and board 6 while the case 1 is in the closed state, or closed position. An example of such a configuration can be seen in FIG. 7, where tools 7 are storeable in a diagonal orientation across the board 6 and body within the case 1. Pins 14, annular structures 13, and tool retaining members 19 can be positioned on the board 6 to help facilitate this storing position of the tools 7. The tool retaining members 19 can be structured as pins or posts, for example and be arranged on the board 6 to help facilitate positioning of one or more tools on the board 6 for storage within the case 1 when the case is in a closed position, or closed state. Such tool retaining members 19 can be configured to be removably attachable to the board within holes 21 so that after the tools 7 are extracted, these members can be moveable to other positions on the board 6 and also returnable to their storage position to facilitate tool storage within the case 1. In other embodiments, the tool retaining members 19 may be integral to the board 6 or otherwise affixed to the board 6 so that they are not removable.

The apparatus can be configured to include an electronic device or can be configured to be utilized in conjunction with a user's already owned electronic device (e.g. a kit can be provided that includes a case 1 with the board 6 and other elements within the case 1 for use in conjunction with a user's electronic device he or she may already own or use). That electronic device can be a smart phone, a tablet, a personal digital assistant, or other type of electronic device that may have a camera sensor and a display that may display visually the output of what the camera sensor detects. For instance, a smart phone 22 can be used in conjunction with the apparatus when the case 1 is in its open position and also in a standing position (e.g. the standing position shown in FIGS. 3-5). The smart phone 22 can be positioned on a mounting feature of the body 2, such as a ledge 11 defined on the body below the window 5 or adjacent the window 5 so that a camera sensor of the smart phone is positioned within the opening 4 of the window 5 while the board 6 is positioned on a work surface 15 under the lid 3 and support portion 2a of the case, as shown for example in FIGS. 2 and 4. Posts can be positioned on the body 2 adjacent the window 5 to help retain the smart phone 22 adjacent the window while it is perched or held on the ledge 11 so that the smart phone's camera sensor is positioned in the opening of the window defined in the body 2. For instance posts can be defined on the body 2 or positioned on the body 2 adjacent a top side of the window and be spaced apart from each other to define a space between the posts that is sized to receive a top portion or a bottom portion of the electronic device when that device is positioned on the ledge 11 to help retain the device over the opening 4 so that the device can be removably mounted in a suitable location over the opening 4 so that the camera sensor of the device is able to capture an image of the board 6 on the work surface 15 when the electronic device is mounted on the body 2 via the ledge 11. The spaced apart posts can help keep the mounted electronic device in a stable, mounted position while it rests on the ledge 11 and other portion(s) of the body 2 adjacent the opening 4.

A display 23 of the smart phone 22 can illustrate, or display, the output from the smart phone's camera sensor when a camera application is run on the smart phone. This can allow the display 23 to illustrate the image 23a of the board 6 and other elements positioned adjacent to and below the opening 4 of the window 5 on the work surface 15 under the lid 3 and body 2 when the case 1 is in its standing position that can be obtained via the camera sensor and at least one application stored in the non-transitory memory of the phone that is run by a processor of the smart phone 22 to utilize the camera sensor and generate the image 23a. In addition to generation of the image 23a, the smart phone can be used to also record the captured images obtained via the camera sensor to record video of the game board and any motion of tools that may occur to manipulate an elongated member 10, members 17, or other elements on the board 6. while the smart phone is mounted to the body while the case 1 is in the standing position.

In some embodiments, a band-like member can be positioned around the lid 3 and support portion 2a to help lock the lid 3 and body 2 in the standing position. Alternatively, the hinges 3a or other connection mechanism can include a feature that helps keep the lid and body in the standing position so that the smart phone 22 can be reliably retained in position. Such a feature can include, as examples, one or more clasps or can include extendable and lockable members that may positioned adjacent the hinges 3a and configured to be locked to hold the lid 3 relative to the support portion 2a at a particular orientation to help maintain the case in its standing position while also being unlockable to facilitate adjustment of the case into its closed position. When extendable members are provided to extend between the support portion 2a and the lid 3, such members can be configured so that they can also be adjusted to an unlocked position in which those members can retract within the case adjacent the hinges to be stored within the case 1 when the lid 3 is moved to close the case 1. Other embodiments may utilize other types of mechanisms to help maintain the case in its standing position while the case is in an open state as well.

For example, in yet other embodiments, a foldable insert 61 can be provided. The insert 61 can be positionable on an inner surface of the lid 3 can be partially extended from the lid 3 to help maintain the case 1 in the standing position and also help define a playing surface on which the board 6 is positionable under the lid 3 and support portion 2a.

Figure 8:
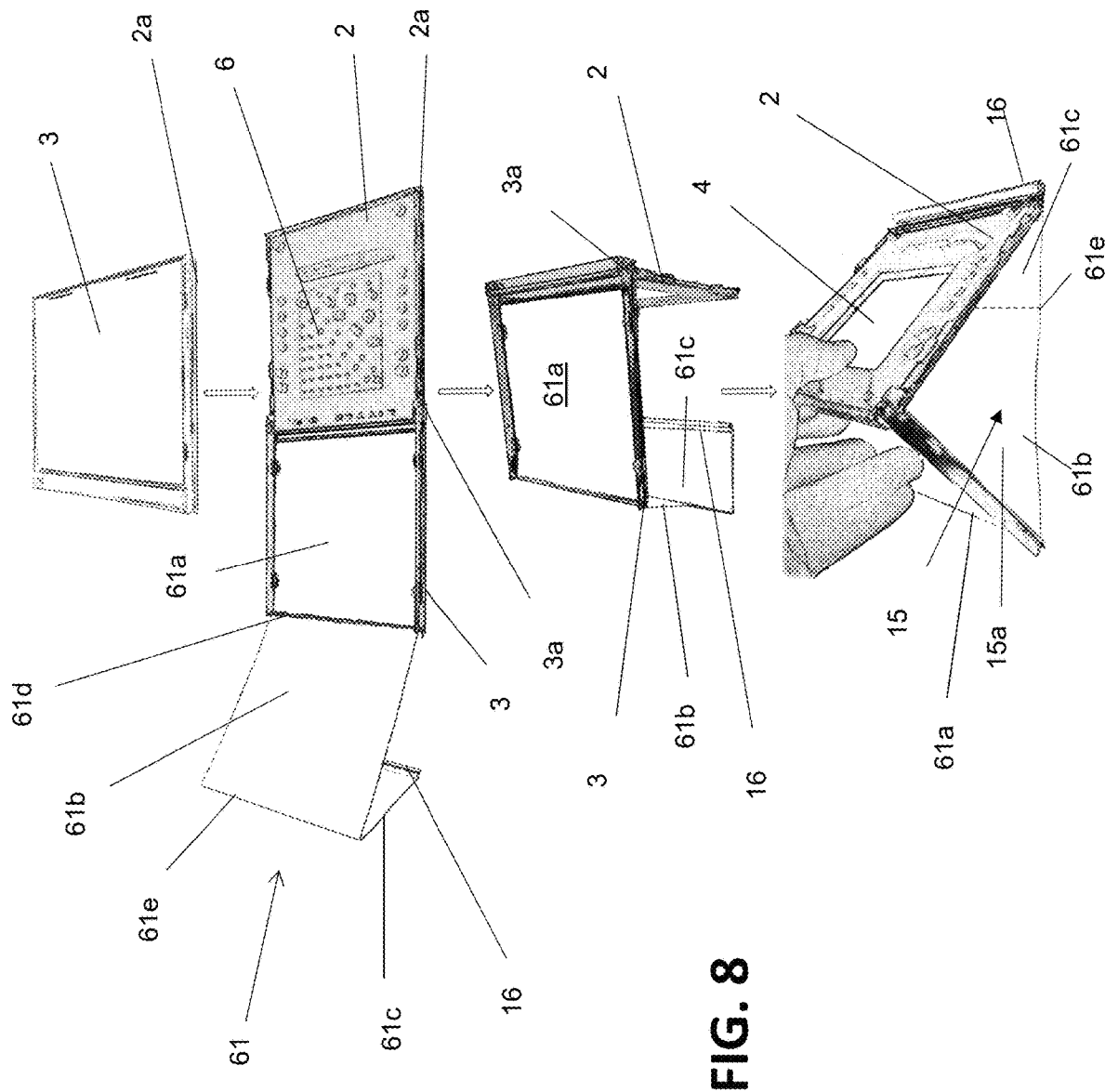
FIG. 8 is a schematic diagram illustrating a process by which an exemplary embodiment of the housing can be adjusted from the closed state (e.g.

For instance, as may be best appreciated from FIG. 8, a foldable insert 61 can be provided so that it is retained on an inner surface of the lid 3 that is opposite its outer surface. This positioning of the foldable insert 61 can allow the insert to be retained within the case 1 when the case is in a closed state while also allowing portions of the foldable insert to be extended from the lid 3 when the case 1 is in an open state. The foldable insert 61 can be composed of a foldable material, such as paper, or construction paper. After the case 1 is opened, a second portion 61b and a third portion 61c of the foldable insert as well as a distal portion 16 of the insert can be moved away from a first portion 61a of the insert that is positioned on the inner surface of the lid 3. The second portion 61b can be between the first portion 61a and the third portion 61c of the insert. The distal portion 16 can include a free distal end of the insert 61. The third portion 61c of the insert can be positioned between the distal portion 16 and the second portion 61b of the insert. A first fold 61d can be defined in the insert 61 such that the second portion is rotatable relative to the first portion 61a. The first fold 61d can extend along a width of the body of the insert 61 and define an axis about which the second portion is rotatable relative to the first portion 61a retained on the inner surface of the lid 3. A second fold 61e can be defined between the third portion 61c and the second portion 61b of the insert 61. The second fold 61e can extend along the width of the body of the insert 61 and define an axis of rotation about which the third portion 61c is moveable relative to the second portion 61b of the insert 61. The distal portion 16 can be defined adjacent to the third portion 61c at a distal end of the body of the insert 61. The distal portion 16 can be structured to define a groove, a bump, a clasp, or other retention feature that engages a distal lower end of the support portion 2a when the case is in the standing position. The distal portion 16 can be sized and shaped to engage the lower end of the support portion 2a of the case by being structured so that the lower end of the support portion can be positioned in, in contact with, and/or engaged by the distal portion 16 so that the lower end of the support portion is held in a position at which it extends away from the lid at a pre-selected angle for defining the standing position of the case. The distal portion of the insert 61 can be configured so that at least a part of the distal portion may be on the outer surface of the lower end of the support portion 2a when the case is in the standing position to engage the support portion 2a and help maintain the position of the case in the standing position. The engagement of the lower end of the support portion 2a with the distal portion 16 of the insert 61 can also help retain the lid 3 in a position at which it extends at an angle away from the support portion while the case is in the standing position via the first portion of the insert resting on the inner surface of the lid and the second portion 61b of the insert extending from the lower distal end of the lid 3 toward the distal portion 16. The insert 61 can be configured to retain the position of the lid and the angle at which the lid 3 and the support portion 2a extend away from each other may be a 30°-110°, or 30°-100° degree angle in some embodiments. In some embodiments, the angle can be 90° or about 90° (e.g. 85°-95° or 80° to) 100°.

A user can manipulate the insert 61 via his or her hands (or just by use of a single hand) to extend the insert from its folded, stored position to its extended, support position as shown in FIG. 8. For example, the user can open the case and subsequently unfold the second portion 61b to move the distal portion 16 away from the first portion 61a via rotational motion about the first fold 61d. The lid can be then be moved so that the lid extends at an angle of 90° from the support portion 2a via the hinges 3a. In this position, the inner surface of the lid 3 that retains the first portion 61a of the insert may be facing outwardly while the external surface of the lid faces toward the support portion 2a and/or a work surface 15. The second portion 61b of the insert can be moved about the first fold 61d so that the third portion 61c also moves about the second fold 61e to move the distal portion 16 toward the lower end of the support portion 2a of the case 1 while the first portion 61a of the insert is retained on the inner surface of the lid 3. The distal portion 16 can then be brought into engagement with the lower end of the support portion 2a to retain the lower end of the support portion 2a and prevent the support portion 2a from further motion relative to the lid 3. In such a position, the second and third portions 61b and 61c of the insert 61 may extend substantially flatly between the flower ends of the lid 3 and the support portion 2a (e.g. the second and third portions are positioned to extend linearly at about a 0° angle (e.g. 0° or an angle that is +/−2° from 0°) from the second fold 61e. The second and third portions 61b and 61c can rest on a tabletop, desktop, floor, or other relatively flat surface to define a work surface 15 on which the board 6 can be positioned under the lid 3 and the support portion 2a. The second portion 61b can extend from the first fold 61d at an angle relative to the first portion 61a that rests on the inner surface of the lid 3 when the insert 61 is in its extended, support position. This angle can be in the range of 30°-60°, and, in some embodiments, may be about 45° (e.g. 45° or in the range of 40° to 50°). The third portion 61c of the insert can extend from adjacent the lower portion of the support portion 2a toward the second portion 61b of the insert (and the second fold 61e) at an angle relative to the lower end of the support portion 2a when the insert is in its extended support position. This angle also can be about 45° (e.g. 45° or in the range of 40° to 50°). The insert 61 being extended from its stored, folded position to its extended support position can help keep or support the case in its standing position. It also allows at least one portion of the insert to define the work surface 15 on which the board 6 can be positioned under the lid 3 and the support portion 2a (e.g. the second portion 61b and the third portion 61c between the lower end of the lid 3 and the lower end of the support portion 2a when the case is in the standing position).

Figure 2:
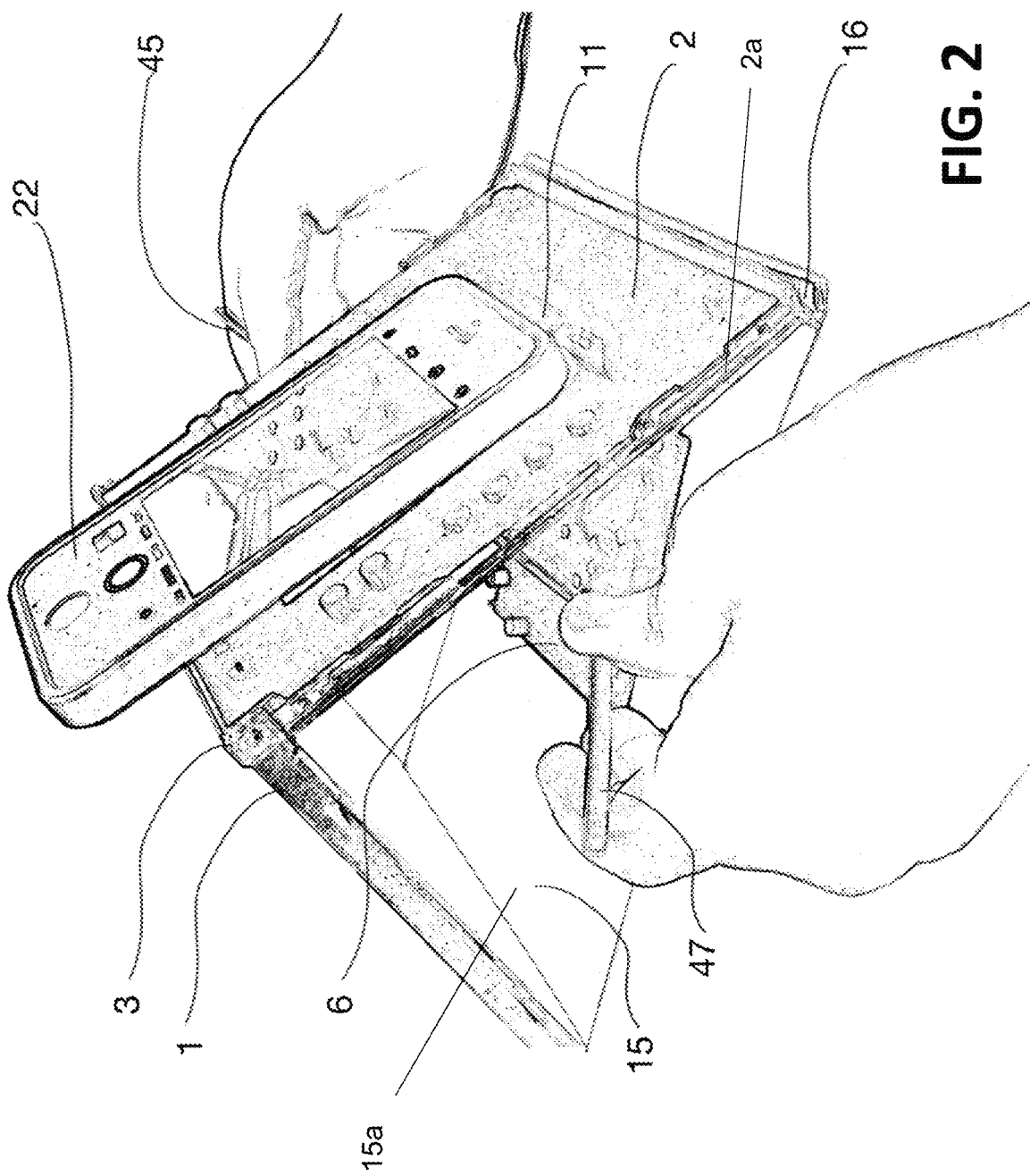
FIG. 2 is a side perspective view of the first exemplary embodiment of an apparatus for developing fine motor skills applicable to surgical operations with the case of the device for retaining parts of the kit in an opened state and in a standing position.
Figure 3:
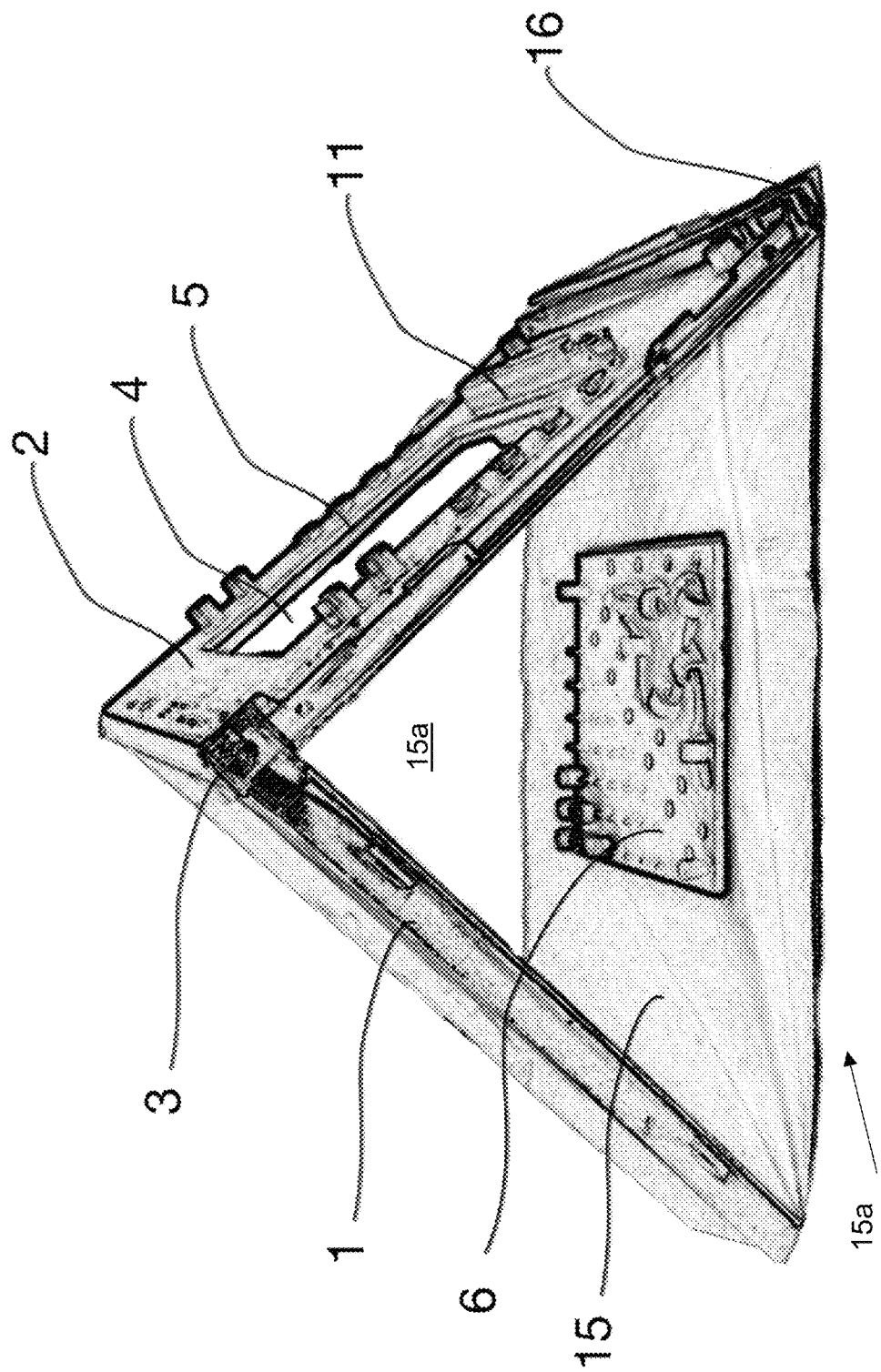
FIG. 3 is a side view of the first exemplary embodiment of an apparatus for developing fine motor skills applicable to surgical operations similar to what is shown in FIG. 2 without the mobile electronic device being mounted on the body 2.
Figure 4:
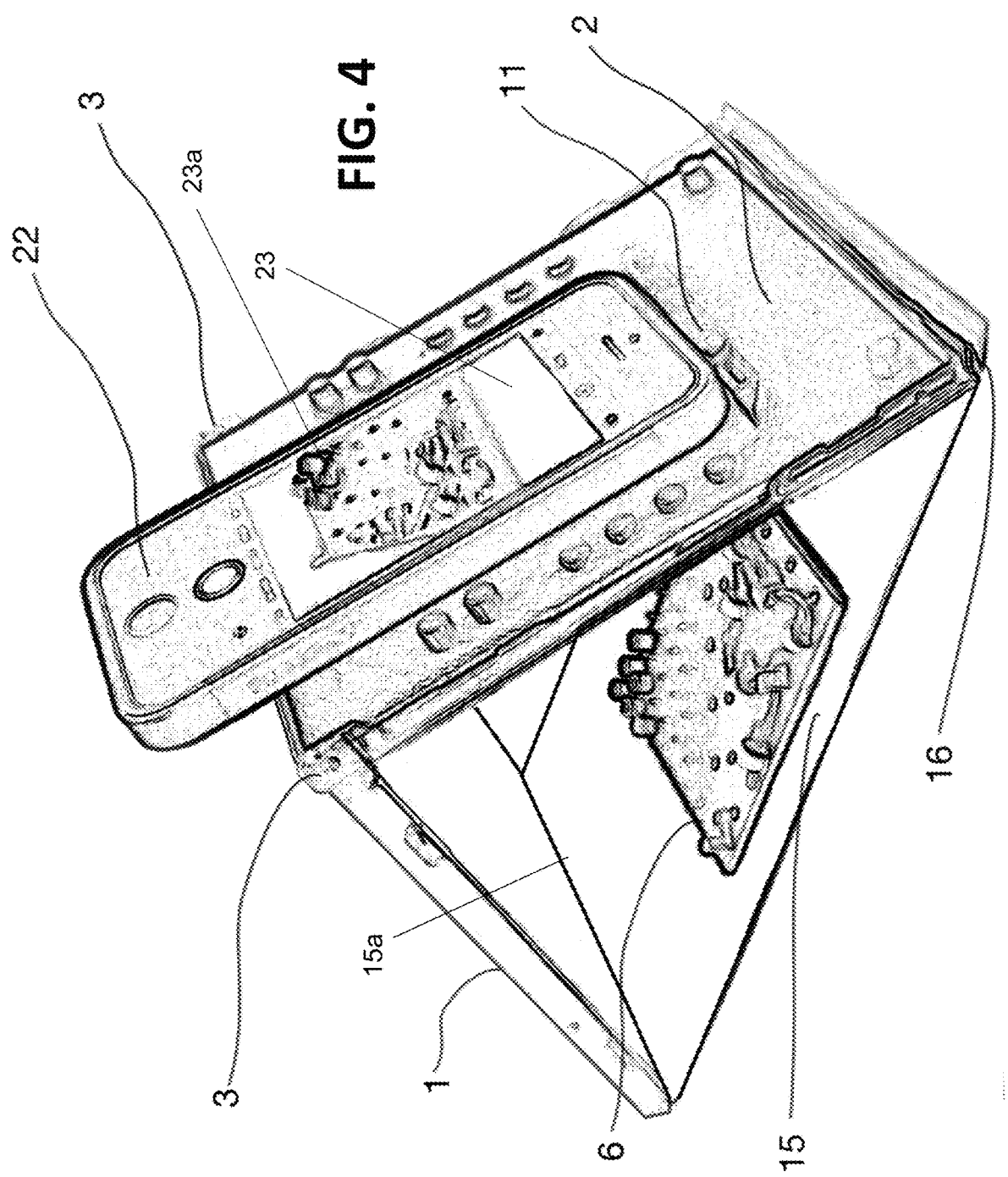
FIG. 4 is a perspective view of the first exemplary embodiment of an apparatus for developing fine motor skills applicable to surgical operations with the case for retaining parts of the kit in an opened state and the case adjusted into a standing position.
Figure 5:
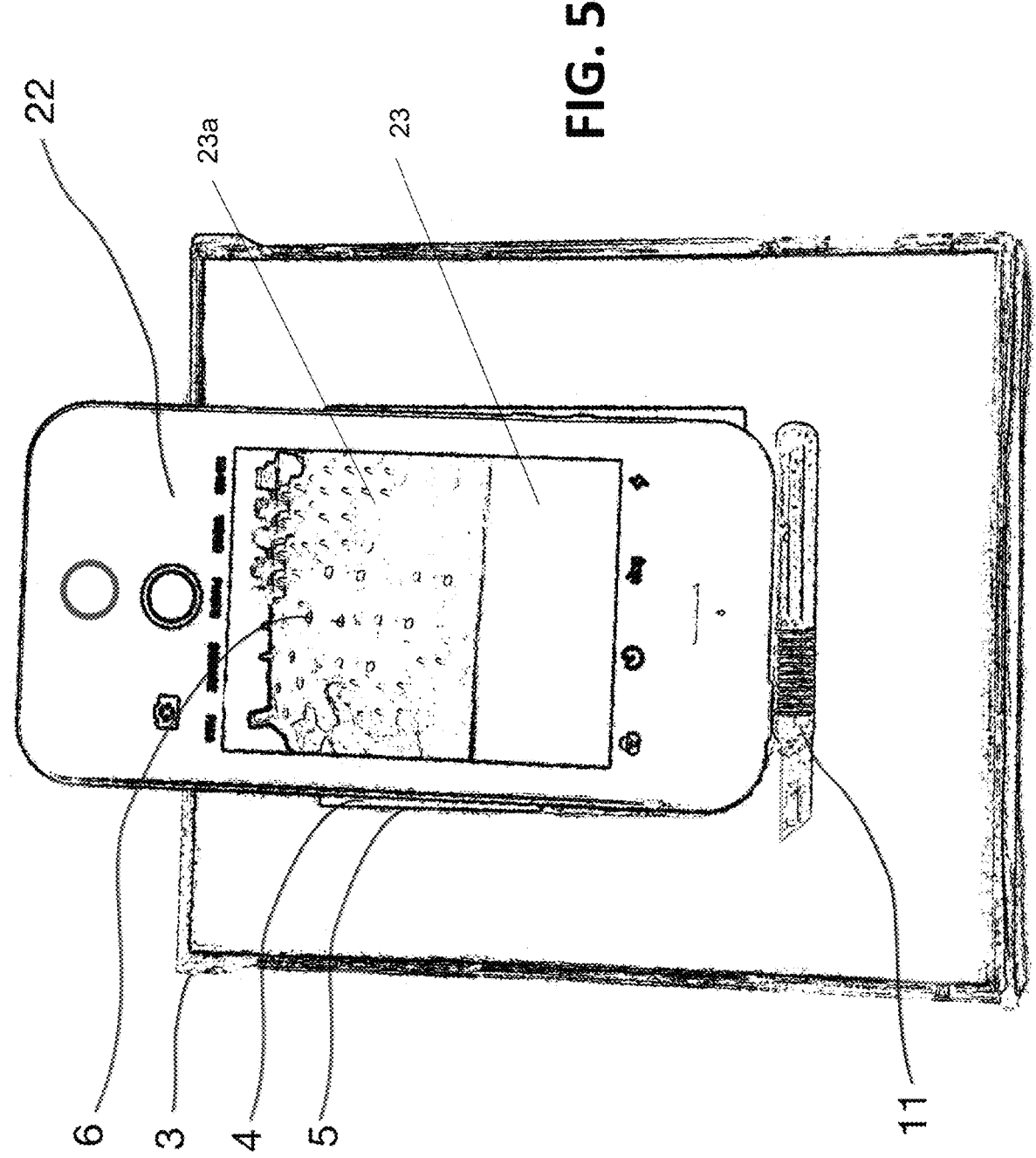
FIG. 5 is a front view of the first exemplary embodiment of an apparatus for developing fine motor skills applicable to surgical operations in a state and position that is similar to what is shown in FIG. 4.
Figure 6:
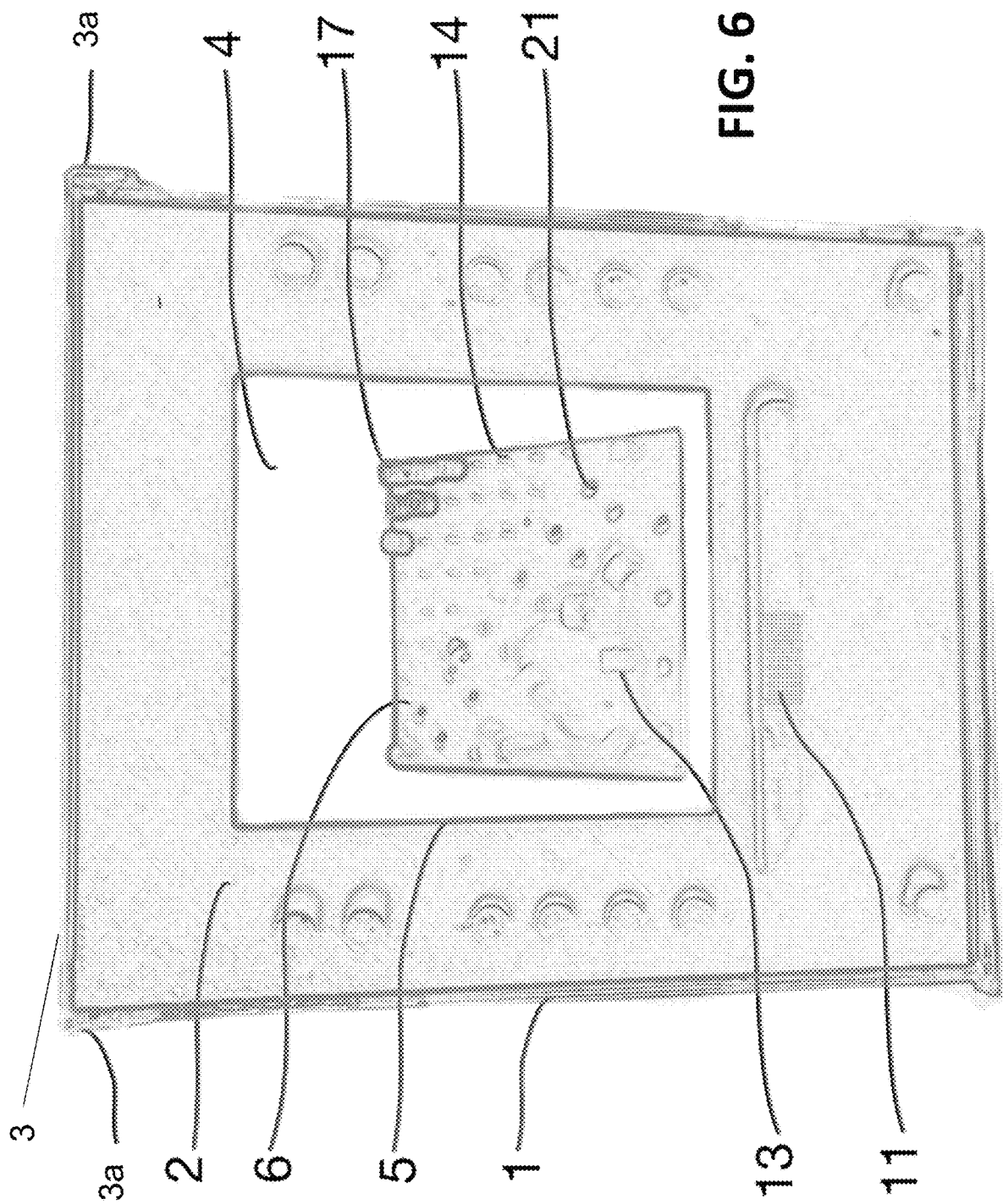
FIG. 6 is a front view of the first exemplary embodiment of an apparatus for developing fine motor skills applicable to surgical operations in a state and position that is similar to what is shown in FIG. 3.

While in the standing position, the lid 3, work surface 15 and support portion 2a of the case can define relatively triangular shaped side openings 15a. A user can use his or her hands on opposite sides of the side openings 15a as shown in FIG. 2, for example, to manipulate tools within the work space above the work surface 15 and board 6 to move at least one elongated member 10, positionable member 17, removably attachable member 17, or other element positioned on the board 6. For instance, at least one tool can be inserted above the work surface via at least one of the side openings 15a to manipulate the elongated member to slide through annular structures 13 and/or move between pins or other elements on the board to extract the elongated member. As another example, at least one tool can be used to take an elongated member 10 and slide it through the annular structures to a desired position. As yet another example, at least one tool (e.g. tapered tools or a tweezer) can be inserted via at least one opening 15a for moving a member 17 or a pin from one hole in the board 6 to another hole in the board 6. These actions can be performed while a user uses his or her eyes to look through the opening 4 to see the board 6 or looks at a display of an electronic device mounted over the opening 4 so that a camera sensor of the electronic device facilitates generation of an image 23a showing the board 6 on the work surface and the user's use of tools to manipulate items on the board or adjacent the board 6.

For instance, after the case is moved to its standing position and the insert 61 is positioned to help maintain the case in its standing position, the board 6 can be removed from the body to no longer cover the opening 4 and be positioned on the work surface 15 under the opening 4 so that a user can see the board 6 on the work surface 15 through the opening 4. A smart phone 22 can then be mounted to the body 2 via the ledge 11 to position the smart phone to generate a display showing the board 6. Once the smart phone 22 is suitably positioned and the board 6 is visible in the display 23 via its placement under the lid 3 and body 2 on the work surface 15 adjacent the opening 4, a user may manipulate one or more tools 7 with his or her hands to insert them into the open sides below the lid and body 2 as shown for example in FIG. 2. The camera sensor of the smart phone can detect the tools and user hands interacting with the board 6 and display the tools as shown for example in FIG. 7.

A user may then practice watching the board 6 and elements on the board 6 via the display 23 while the user uses his or her hands to manipulate tools 7 to move the members 17 onto different parts of the board 6 or moves a flexible elongated member 10 through different annular structures 13 or holes defined on the board 6 or passed pins 14 or other structure otherwise positioned on the board. Such actions can help the user develop fine motor skills associated with use of his or her hands manipulating tools to manipulate the members 17 or flexible members 10. Such practice can also help train the user to develop a sense of depth perception associated with such physical action that corresponds to how a surgeon may utilize a display from a fiber optic scope or other type of scope that may be utilized in some types of surgical procedures.

In other embodiments, the smart phone 22 may not be used. Instead, a user may simply look through the opening 4 of the window 5 to manipulate the tools while seeing the board 6 through the opening 4 defined in the window 5 in the body 2. As yet another option, the user may utilize the opening 4 of the window 5 as a simulated surgical opening in which the user is to operate within so that the tools and user hand(s) are only passed through the opening 4 of the window when engaging the members on the board to manipulate those members. Such practice can help the user develop fine motor skills associated with surgery while also developing physical senses and "feel" associated with working in a limited space that can constrict certain types of hand motions similar to how a user can be constricted by a particular type of incision utilized in some types of surgical procedures.

In some embodiments, a camera sensor (e.g. a digital camera, camera sensor of a smart phone 22, other type of camera sensor or video recording sensor, etc.) can be mounted adjacent the window 5 and be communicatively connected to one or more displays that can be positioned elsewhere. A user could then look through that remote display to practice moving his or her hands to manipulate tools as shown for example in FIG. 2 and as discussed elsewhere herein. For such a use, the camera could be connected to the display device (e.g. a television, a liquid crystal display, a smart phone, or a tablet device) via a Bluetooth connection or other type of direct wireless connection or via a wired connection (e.g. a universal serial bus (USB) connection). In some embodiments, multiple different camera sensors of different players, or users, could be connected to a single display so that the different users' actions could be seen on a single screen. Such a visualization could permit others to watch the players compete against each other or race against each other to complete pre-defined tasks or to complete an array of tasks in a pre-selected order. Such a visualization could also allow a teacher to show one or more students how certain actions are to be performed so that the student and teacher look at the same screen during a teaching or training session.

As yet another option, the user may utilize the opening of the window to manipulate tools while using an operating microscope or endoscope to provide visualization. For such embodiments, the microscope or endoscope can be understood to include the camera sensor.

When a user is done practicing, the apparatus can be manipulated so that the case 1 is in its closed position and all the tools and members are within the case. This can allow the case 1 to be easily moved about and stored with all the tools, members, and the board needed for further practice at a later time. The structure and arrangement of the tools 7, case 1, board 6, and members can also permit the case 1, body 2, and board 6 to all be relatively small. For instance, some embodiments of the case can be sized comparable to a clear plastic compact disc jewel case. Of course, other embodiments may utilize larger structured cases 1, bodies 2, and boards 6 or smaller cases 1, bodies 2 and boards 6.

The board 6, body 2, and case 1 are shown as polygonal structures. It should be understood that the shape and size of those structures can be different to meet different sets of design criteria (e.g. hexagonal shaped, circular shaped, oval shaped, etc.). Similarly, it should be understood that the shape, size, and arrangement of the structured defined on the board 6 can be any number or arrangement to meet a particular design objective. As yet another example, the number of tools 7 provided, their structure and composition, and their type can be any arrangement that may meet a particular set of design objectives. As yet another example, the size of the case 1, size of the body 2, and size of the window 5, opening 4 and board 6 can be adjusted to accommodate different types of electrical devices. For example, some embodiments may be sized and configured for use in conjunction with a particular type or series of smart phones and other embodiments may be sized and configured for use in conjunction with a particular size or type of electronic tablet, digital camera, or other type of electronic device.

It should also be understood that the apparatus can be configured a kit. For instance, a kit can include the case 1, body 2, board 6, elongated member 10, members 17, and tools 7. Instructions may be included in the kit to inform a user how to utilize the kit in conjunction with the user's smart phone or other type of electronic device having at least one camera sensor and a display connected to the one or more camera sensors. The instructions that are provided can also help illustrate how to adjust the insert 61 from its stored position to its extended support position via first and second folds 61*d* and 61*e*. At least one separate second kit can be provided that may provide additional tools or at least one other board 6 having a different arrangement of annular structures 13, holes 21, pins, members 17 and/or elongated members 10. A downloadable application could also be provided for download onto a user's electronic device to facilitate user of the board 6, tools, and other elements while the case is in its standing position. The downloadable application can provide a communication interface so that multiple users may compete against each other via their devices while being remote from each other, for example. As yet another example, such a downloadable application can be supported by at least one server to facilitate the exchange of communications between users of different devices for posting of top times for achieving certain tasks via the board and tools to facilitate competition that helps the users improve the fine motor skills in an entertaining way that may also permit the users to be more productive in improving their skills.

In some embodiments, there may only be a few members 17 and 10 and tools 7 or no such members and tools provided with the kit. Different assemblies of tools and/or members 10, 17 can be provided with the kit or sold separately. For instance, it is contemplated that different assemblies of tools and members can be provided as supplemental kits or assemblies for use in conjunction with the apparatus 1. Those supplemental assemblies may include instructions on how to utilize those tools and members for practicing certain types of surgical skills.

Embodiments of the apparatus may also be utilized for games or competitions. For instance, manipulating the members 17 or 10 in different ways on the board can be assigned different point totals. Users may position their respective cases, boards, and tools adjacent to each other with the cases in the standing positions to compete at the same time to try and obtain as may points as possible within a particular time period. As another type of competition, each user may race to see which use can manipulate so many members 10, 17 in a particular way so that the first user to finish the manipulations of the members wins the competition. The lids 3 may be clear in color so that users who face each other can monitor their opponents progress. Such positioning can also permit the users to banter with each other about how the other is performing while they compete. Such banter can include "trash talk" or can (alternatively or in addition) include encouragement. Instructions may be provided with the apparatus to identify different possible game or competition options for use of the apparatus.

In some embodiments, it is contemplated that more than two users may position their cases in the open standing positions adjacent to each other in a circle (e.g. three or more users may be positioned with all the cases on a work surface in their standing positions so that the users form a perimeter around the cases and board 6 positioned under the cases. In such arrangements, the users may then compete similarly to the two-user games and competitions discussed above.

As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of the apparatus for developing fine motor skills applicable to surgical operations, kits for developing fine motor skills applicable to surgical operations and methods of making and using the same have been shown and described above, it is to be distinctly understood that the invention is not limited thereto but may be otherwise variously embodied and practiced within the scope of the following claims.

What is claimed is:

1. A method for practicing fine motor skills of a user to develop the fine motor skills comprising:
   moving a lid of a case to open the case;
   removing a board from a window of a body retained in a support portion of the case that is moveably connected to the lid after the case is opened, the removing of the board uncovering an opening defined by the window;
   moving the lid and the support portion so that the case is moved to a standing position such that the lid of the case and the support portion of the case extend away from each other at an angle to engage a work surface to position the case in the standing position, the lid and the support portion each engaging the work surface when the case is in the standing position;
   placing the board on the work surface under the lid and under the support portion while the case is in the standing position so that the board is visible via the opening defined by the window of the body;
   manipulating a first tool to move the first tool above the board while the board is on the work surface and the case is in the standing position via a first side opening defined by the lid and the support portion of the case; and
   using the first tool to move at least one object on the board while the board is on the work surface and the case is in the standing position.

2. The method of claim 1, wherein the object is an elongated member that is positionable through annular structures positioned on the board.

3. The method of claim 1 wherein the object is at least one member that is movably positionable in different holes defined in the board.

4. The method of claim 1, wherein the first tool is a tweezer.

5. The method of claim 1, comprising:
   removing the first tool and a second tool from the case after the case is opened;
   manipulating a second tool to move the second tool above the board while the board is on the work surface and the case is in the standing position via a second side opening defined by the lid and the support portion of the case;
   using the second tool in conjunction with movement of the first tool to move the at least one object on the board while the board is on the work surface and the case is in the standing position.

6. The method of claim 5, wherein the first tool is a tapered tool and the second tool is a tapered tool.

7. The method of claim 5 wherein the at least one object is comprised of an elongated member that is passable through annular structures defined on the board or a member that is removably positionable within different holes defined in the board.

8. The method of claim 1, comprising:
extending an insert positioned on an inner surface of the lid after the case is opened so that the insert is moved from a stored position to an extended support position.

9. The method of claim 8, wherein the extending of the insert comprises:
adjusting the insert so that a distal portion of the insert is moved away from a first portion of the insert that is positioned on the inner surface of the lid.

10. The method of claim 8, wherein the extending of the insert comprises:
adjusting the insert so that a distal portion of the insert is moved away from a first portion of the insert that is positioned on the inner surface of the lid via motion of a second portion of the insert about a first fold defined between the first portion of the insert and the second portion of the insert and via motion of a third portion of the insert about a second fold defined between the second portion of the insert and a third portion of the insert.

11. The method of claim 10, comprising:
engaging the distal portion of the insert with a lower end of the support portion to maintain the case in the standing position such that the third portion of the insert is between the lower end of the support portion of the case and a lower end of the lid when the case is in the standing position and the second portion of the insert is between the lower end of the lid and the lower end of the support portion of the case when the case is in the standing position and the third portion of the insert and the second portion of the insert define the work surface under the lid and under the support portion of the case.

12. The method of claim 11, comprising:
contacting the second portion of the insert and the third portion of the insert with a desktop, a tabletop, or a countertop when the case is in the standing position and prior to placing the board on the work surface.

13. The method of claim 11, comprising:
mounting an electronic device on a ledge of the body while the case is in the standing position to position a camera sensor of the electronic device over the opening;
generating an image of the board on a display of the electronic device after the electronic device is mounted on the body while the case is in the standing position.

14. The method of claim 13, comprising:
recording motion of the first tool over the board via the camera sensor and displaying the motion of the first tool over the board via the display while the electronic device is mounted on the body while the case is in the standing position.

15. A kit for developing fine motor skills applicable to surgical operations, the kit comprising:
a case having a lid that is moveably connected to a support portion such that the case is moveable between a closed position to an open position, the lid of the case and the support portion of the case being moveable to extend away from each other at an angle to engage a work surface to position the case in a standing position while the case is in the open position;
a body being retained by the support portion of the case, the body having an opening;
a board removably positionable in the opening of the body to cover the opening when positioned in the opening and expose the opening when removed from the opening, the board having a plurality of annular structures and holes;
a first elongated member that is passable through the annular structures, the first elongated member being retainable within the case when the case is in the closed position;
a plurality of members that are removably positionable within the holes of the board, the plurality of members being retainable within the case when the case is in the closed position; and
the board being sized and configured to be positionable on the work surface under the lid and under the support portion of the case when the case is moved to the standing position via motion of the lid relative to the support portion such that the board is viewable through the opening of the body when the board is on the work surface under the lid and under the support portion of the case.

16. The kit of claim 15, comprising:
a first tool that is retainable within the case in a recess defined in the body when the case is in the closed position;
the first tool being positionable over the board on the work surface via a side opening defined by the lid and the support portion when the case is in the standing position so that the first tool is moveable over the board to manipulate the first elongated member.

17. The kit of claim 16, comprising:
a second tool that is retainable within the case when the case is in the closed position;
the first tool being positionable over the board on the work surface via a side opening defined by the lid and the support portion when the case is in the standing position so that the first tool is moveable over the board to manipulate a first member of the plurality of members to move the first member from a first hole in the board to a second hole in the board.

18. The kit of claim 15, comprising:
an insert that is retainable on an inner surface of the lid, the insert being extendable from the inner surface of the lid when the case is in the open position to adjust the insert between a stowed position and a support position.

19. The kit of claim 18, wherein the insert has a first portion retained on the inner surface of the lid, a second portion, a third portion, and a distal portion, a first fold being defined between the first portion of the insert and a second portion of the insert, a second fold being defined between the second portion of the insert and the third portion of the insert, the distal portion being configured to engage a lower end of the support portion of the case when the case is in the standing position, the third portion of the insert being between the second portion of the insert and the distal portion of the insert.

20. The kit of claim 19, wherein the second portion is moveable relative to the first portion of the insert via the first fold and the third portion of the insert is moveable relative to the second portion of the insert via the second fold, the first and second folds configured such that the distal portion is positionable to engage the lower end of the support portion of the case when the case is in the standing position and the second portion of the insert and the third portion of the insert are between the lower end of the support portion of the case and a lower end of the lid to define the work surface when the case is in the standing position and the insert is moved to the support position.

* * * * *